Patented Oct. 2, 1928.

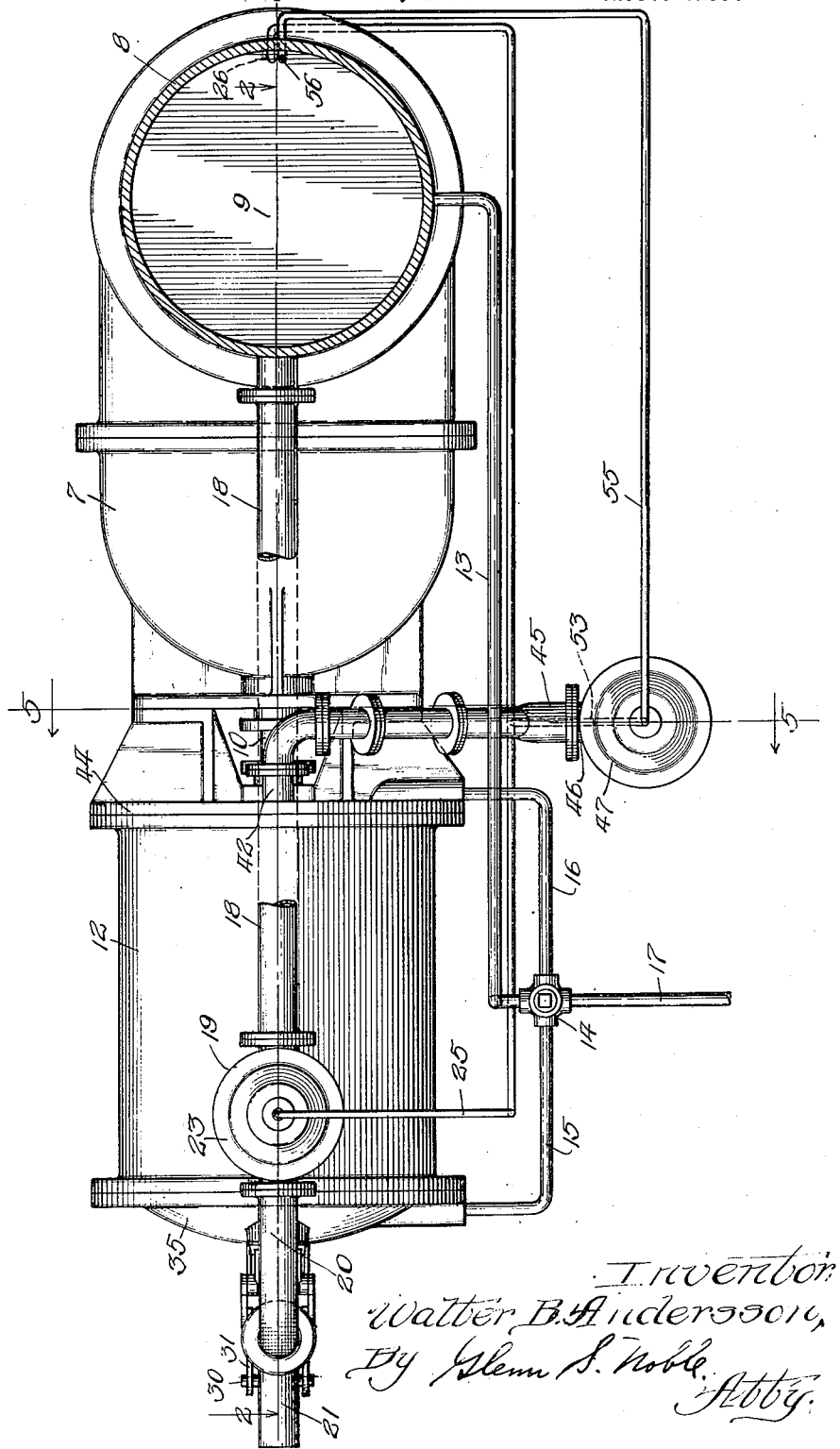

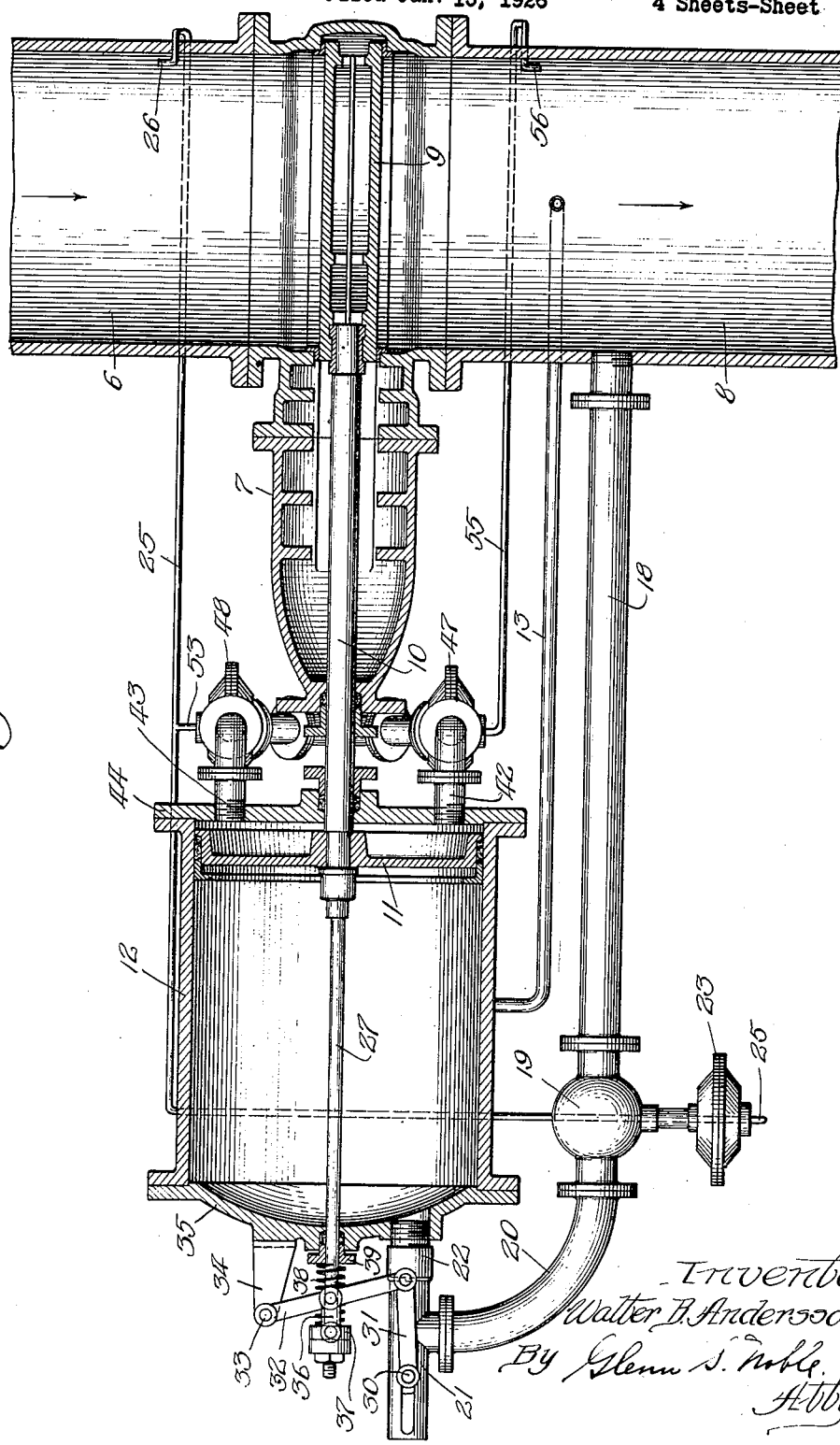

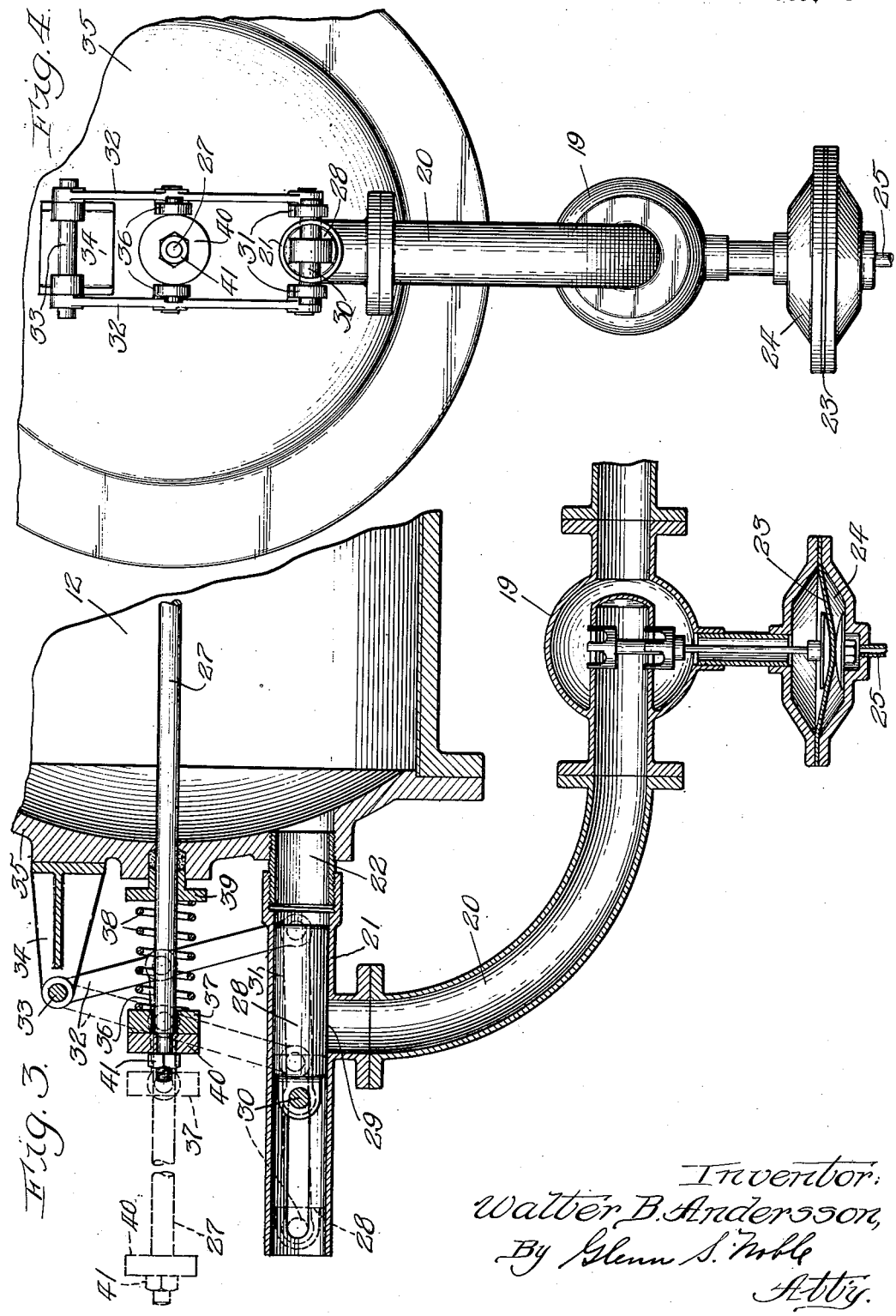

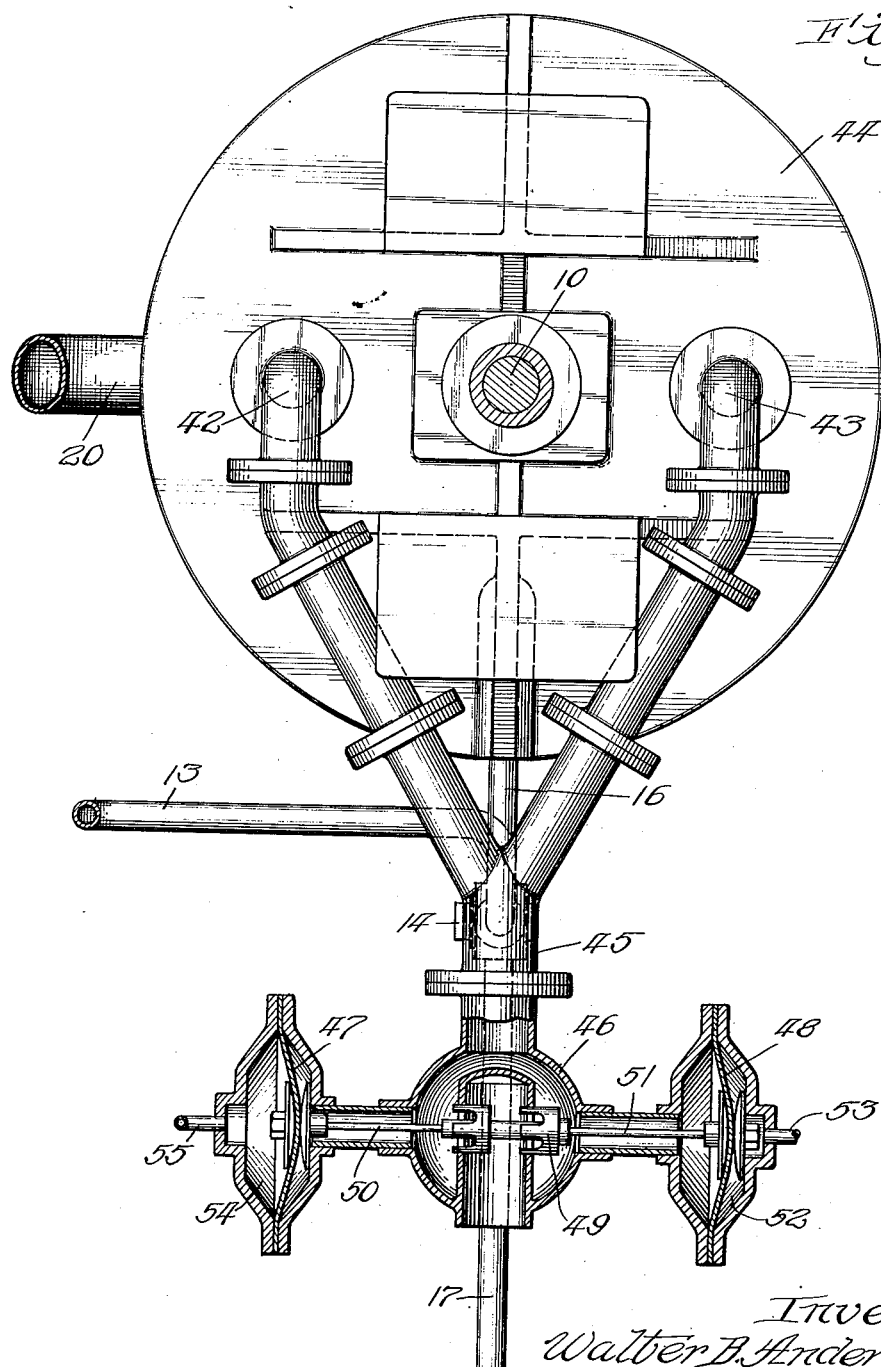

1,685,932

UNITED STATES PATENT OFFICE.

WALTER B. ANDERSSON, OF CHICAGO, ILLINOIS.

HYDRAULIC GATE AND CHECK VALVE.

Application filed January 15, 1926. Serial No. 81,400.

In water works utilizing centrifugal pumps, it is more or less customary to provide check valves for automatically stopping the return or back flow of the water through the pump in the event of any accident whereby the pump becomes stopped or fails to maintain the necessary pressure in the mains. Such check valves are usually used in addition to the regular gate valves for shutting off the mains. These check valves are not only expensive, particularly for large sized pipes, but interfere with the flow of the water and cause sufficient obstruction so that there is a waste of power necessary to force the water through the check valve in the normal operation of the apparatus. Various forms of check valves have been used, but when those of the butterfly type have been employed, it becomes difficult to properly control the same where large pipes and high pressure is involved. The necessity for such check valves is well understood as the centrifugal pump, when stopped, does not cut off the passageway therethrough, and consequently, the water in the mains is free to flow back through the pump.

The gate valves commonly used in connection with pumping systems are provided with pistons and cylinders for opening and closing the same as the gates in large sized valves are more or less ponderous affairs and considerable force is required for actuating the same.

In accordance with the present invention, I provide a combined gate and check valve or means whereby a gate valve may be automatically opened and closed by the pressure of the fluid and provide means whereby the usual closing apparatus may be utilized for such automatic control.

The objects of this invention are to provide an improved valve apparatus for pumping systems; to provide a combined check and gate valve for water mains which may be readily constructed and which will be particularly durable and efficient in operation; to provide automatic controlling means for actuating a gate valve; and to provide such other novel features and advantages as will be described more fully hereinafter.

In the accompanying drawings illustrating this invention:

Figure 1 is a plan view;

Figure 2 is a horizontal sectional view taken on the line 2—2 of Figure 1;

Figure 3 is an enlarged detail of a portion of the controlling mechanism;

Figure 4 is an end view of the parts shown in Figure 3; and

Figure 5 is a sectional view taken on the line 5—5 of Figure 1.

In the particular form of the device as shown in these drawings, the water main or pipe 6 leads from the pump or source of supply to the valve 7 having a pipe or main 8 connected to the outlet or discharge side thereof. The valve gate 9 is connected by the rod 10 with the piston 11 which operates in a cylinder 12 for opening and closing the valve. This piston is actuated by water or other fluid from the mains, and for this purpose a pipe 13 leads from the main 8 to a four-way valve 14. One branch of this valve is connected by a pipe 15 with one end of the cylinder, another branch is connected by a pipe 16 with the opposite end of the cylinder, and the fourth branch leads to the atmosphere or drains through the pipe 17. Gate valves provided with such normal controlling apparatus are in common use so that detailed description thereof is not necessary, but it will be readily seen that when the valve 14 is turned in one position, it will permit the water from the main to enter one end of the cylinder while the water from the other end of the cylinder passes to the drain, and when the valve 14 is turned to another position it permits the water from the main to pass through the pipe 16 to the inner end of the cylinder and force the piston outwardly to open the valve, while the water from the opposite side of the piston passes to the drain.

In accordance with the present invention, I provide means for the automatic operation of this valve under certain conditions while permitting its manual control in the usual manner, which means will now be described.

A pipe 18 leads from the pipe 8 to a valve 19 which is connected by a pipe 20 with a valve 21, which is connected with the intake 22 at the outer end of the cylinder 12. The valve 19 is preferably of the balanced type and is controlled by a diaphragm 23 or other similar controlling device. The outer diaphragm chamber 24 is connected by a pipe 25 with a nozzle 26 which is positioned in the pipe 6 with its open end directed up-stream or toward the pump, as shown particularly in Figure 2.

The valve 21 is actuated at times by the tell tale rod 27 of the valve 7 and may be of any suitable construction adapted for this purpose. In the form shown, the valve plug or piston 28 is made somewhat longer than the inlet opening 29 in order to keep the valve closed during certain predetermined times. The piston 28 is connected by a pin 30 with links 31 which engage with the free ends of the arms 32, which are pivoted at 33 to a lug or bracket 34 on the head 35 of the cylinder 12. The arms 32 are connected at points intermediate of their ends with links 36 which are pivoted at their outer ends to a ring or collar 37 which is slidaby mounted on the rod 27. A spring 38 is interposed between the collar 37 and a suitable abutment, such as the gland 39 on the head 35 and tends to hold the collar in normally projected position, as shown in dotted lines in Figure 3 with the valve 21 open. The rod 27 is also provided with a collar 40 which is secured thereto in any convenient manner, as by means of a nut 41. When the valve 7 is closed, and the rod 27 is at its innermost position, the collar 40 presses against the collar 37 and moves the parts connected therewith so as to close the valve 21, as shown in Figure 3. I prefer to have the closing mechanism for the valve 21 arranged so that this valve is closed prior to the end of the stroke of the piston 11, and consequently closing the valve 7, in order to prevent any undue jar on the mechanism. On account of having the valve 21 closed in this manner, there will be a cushioning effect on the piston due to the water on the opposite side and the friction on the parts will also tend to stop the movement as the valve 7 is closed. Ordinarily it is not necessary to completely close valve 7, but if desired, a small amount of water may be allowed to leak past the valve 21 to complete the closure.

In order to somewhat equalize the back pressure on the piston 11 and provide for a balanced discharge of the water from the inner end of the cylinder 12, I provide two outlet pipes 42 and 43 from the opposite sides of the cylinder head 44, which are joined to form a common outlet 45 which is controlled by an outlet valve 46. This outlet valve is of the balanced type and is controlled by two diaphragms or similar devices 47 and 48 which are respectively connected with the valve plug 49 by valve rods 50 and 51. The outer chamber 52 of the diaphragm 48 is connected by a pipe 53 with the pipe 25. The outer chamber 54 of the diaphragm 47 is connected by a pipe 55 with a nozzle 56 which is positioned in the pipe 8 with its opening down stream, as shown particularly in Figure 2.

While the nozzles 26 and 56 may be arranged at any suitable points in the pipes 6 and 8, I prefer to have them on the side adjacent to the portion of the valve 7 which opens first in order to have the full effect of the flow as soon as the valve starts to open.

In order to explain the operation of the device, it may be assumed that the valve 7 and consequently the valve 21 are both open. The flow of the water through the mains will cause a velocity head or pressure in the pipe 25 which produces a pressure on the diaphragm 24 and holds the valve 19 in closed position. At the same time the flow past the nozzle 56 will cause a reduction of pressure in the pipe 55 which permits the diaphragm 47 to move outwardly or to the left, as shown in Figure 5, at which time the valve 46 will be closed. Then assuming that the pump which forces the water to the mains, becomes stopped, or for any reason that there is a reduction of pressure in the pipe 6 and the water begins to flow backwardly through the mains, the velocity head will cause a pressure in the nozzle 56 and consequently in the pipe 55, which will tend to move the diaphragm 47 to open the valve 46, as shown in Figure 5. At the same time, the reversal in the flow past the nozzle 26 will cause a reduction of the pressure in the pipe 25 and consequently a reduction of pressure in the chamber 52 which will permit the diaphragm 48 to move outwardly, as also shown in Figure 5. This will open the valve 46 and permit the water to flow from the inner end of the cylinder 12 out through the valve to the atmosphere or to any suitable waste. The reduction of pressure in the pipe 25 also causes the diaphragm 23 to move outwardly or to the position shown in Figure 3 and to open the valve 19. The water then passes from the main 8 through the pipe 18, valve 19, pipe 21 and valve 22 into the cylinder 12 which causes the piston 11 to move inwardly to close the valve 7. As above described, the valve 21 is preferably completely closed shortly before the piston 11 reaches the inner end of its stroke, and the movement of the piston and connected parts will be cushioned by the water in the discharge end of the cylinder as well as by the friction of the parts in their closing movement.

When the pump again starts or pressure is built up in the pipe 6, until it is greater than the pressure in the pipe 8 or on the opposite side of the valve 7, such pressure will be transmitted to the pipe 25 which will cause the valves 19 and 46 to close and the parts are in proper position to permit the manual control or opening of the valve 7 by manipulating the four-way valve 14 so that the water will enter the inner end of the cylinder 12 and again force the piston 11 outwardly to return the parts to the position first described.

While I have described my invention in connection with water works or systems, it will of course be evident that the apparatus may be used wherever it is applicable, and I do not wish to be limited to such specific use. The term "gate valves" as used herein is intended to designate any suitable "main valves" or "shut-off valves" which may be suitable for controlling the flow through pipes and which may be operated by means of suitable operating mechanism for opening and closing the same. Furthermore, various changes may be made in the construction and arrangement of the parts in order to adapt the device for different conditions and in view of such changes, I do not wish to be limited to the construction herein shown and described, except as specified in the following claims, in which I claim:

1. The combination of a main, a valve in said main, cylinder and piston mechanism for actuating the valve, connections from the main to the cylinder for manually controlling the movement of the piston by means of fluid from the main and means for automatically admitting water from the main to the cylinder to close the valve when the flow in the main is reduced to a predetermined amount.

2. In an apparatus of the character set forth, the combination of a main, a gate valve in said main, a cylinder and piston for operating said valve, a pipe leading from the down stream side of the valve to the outer portion of the cylinder, a valve in said pipe, means connected with the piston for actuating said valve, a second valve in said pipe, a diaphragm for controlling said valve, a pipe leading from the diaphragm chamber to a nozzle directed up stream on the up stream side of the gate valve, an outlet from the opposite end of the cylinder, a valve for controlling said outlet, two diaphragms connected with said last named valve for actuating the same, a connection from one of said diaphragms to the pipe leading to said nozzle, and a connection from the other diaphragm to a nozzle directed down stream on the down stream side of the gate valve.

3. The combination of a main, a gate valve in said main, a cylinder and piston for operating said valve, said piston having a tell tale rod projecting outwardly through the cylinder, a pipe leading from the main on the down stream side of the valve to the outer end of the cylinder, a piston valve for said pipe, means connected with the tell tale rod for actuating said piston valve to close the same when the piston moves inwardly, a spring for opening said piston valve, a diaphragm controlled valve in said pipe, a flow nozzle in the main on the up stream side from the first named valve, a pipe leading from said nozzle to the diaphragm of said diaphragm valve, an outlet from the opposite end of the cylinder, a valve for controlling said outlet, two diaphragms coacting with the last named valve, a connection from said nozzle to one of said diaphragms, and a connection from the other diaphragm to a nozzle which projects down stream in the main, the arrangement being such that the flow of the water through the main will tend to cause the diaphragm controlled valves to be closed and when the flow in the main is reduced a predetermined amount, the diaphragm controlled valves will be opened.

4. The combination with a water main, of a gate valve, a cylinder and piston for opening and closing said valve, a tell tale rod projecting from the piston through the cylinder head, a supply pipe leading from the main to the outer end of the cylinder, a valve in said pipe, means actuated by the tell tale rod for closing said valve when the piston moves to closing position, a spring for opening said valve, a shut off valve in said pipe, a diaphragm connected with said valve for actuating the same, a pipe leading from the diaphragm, a nozzle on said pipe directed up stream in the main on the up stream side of the gate valve, an outlet pipe from the opposite end of the cylinder, an outlet valve for said pipe, two diphragms connected with said valve for actuating the same, a connection from one of said diaphragms to the nozzle pipe, a second nozzle facing down stream on the down stream side of the gate valve, and a connection from said last named nozzle to the second diaphragm for the outlet valve, substantially as described.

WALTER B. ANDERSSON.